(12) United States Patent
Morita et al.

(10) Patent No.: US 9,702,381 B2
(45) Date of Patent: Jul. 11, 2017

(54) HYDRAULIC CONTROL SYSTEM

(71) Applicant: Toyota Jidosha Kabushiki Kaisha, Toyota-shi Aichi-ken (JP)

(72) Inventors: Hiroki Morita, Nagoya (JP); Hirofumi Ota, Toyota (JP); Kohei Dodo, Nisshin (JP); Hideki Kubonoya, Toyota (JP); Naoki Nishimura, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 343 days.

(21) Appl. No.: 14/523,143

(22) Filed: Oct. 24, 2014

(65) Prior Publication Data
US 2015/0113971 A1   Apr. 30, 2015

(30) Foreign Application Priority Data
Oct. 28, 2013   (JP) ................. 2013-222996

(51) Int. Cl.
F16H 61/00   (2006.01)
F15B 11/17   (2006.01)
F15B 21/04   (2006.01)

(52) U.S. Cl.
CPC ............ F15B 11/17 (2013.01); F15B 21/044 (2013.01); F16H 61/0031 (2013.01); F15B 2211/20515 (2013.01); F15B 2211/20523 (2013.01); F15B 2211/20576 (2013.01); F15B 2211/30505 (2013.01); F16H 2061/004 (2013.01); F16H 2312/14 (2013.01)

(58) Field of Classification Search
CPC ................... F15B 21/044; F16H 2061/004
See application file for complete search history.

(56) References Cited

U.S. PATENT DOCUMENTS

| | | | |
|---|---|---|---|
| 7,163,481 B2* | 1/2007 | Takagi | F16H 61/0206 192/3.57 |
| 2006/0120888 A1 | 6/2006 | Kitano et al. | |
| 2009/0082153 A1 | 3/2009 | Fujikawa et al. | |
| 2011/0224879 A1 | 9/2011 | Waku et al. | |

FOREIGN PATENT DOCUMENTS

| | | |
|---|---|---|
| CN | 1781790 A | 6/2006 |
| JP | 2007-113640 A | 5/2007 |
| JP | 2007-170462 A | 7/2007 |
| JP | 2007-247910 A | 9/2007 |

(Continued)

*Primary Examiner* — F. Daniel Lopez
(74) *Attorney, Agent, or Firm* — Dinsmore & Shohl LLP

(57) ABSTRACT

A hydraulic control system includes a first oil passage, a first oil pump, a second oil passage, a second oil pump and a check valve. The first oil pump is disposed in the first oil passage. The second oil passage bypasses the first oil pump, includes an intake oil passage and a discharge oil passage, the intake oil passage and the first oil passage are connected to each other at a connection point, and the discharge oil passage includes an air vent hole. The second oil pump is disposed in the second oil passage, configured to take in oil from the intake passage, and configured to discharge the oil into the discharge oil passage. The check valve is provided between the connection point and the air vent hole, configured to restrict flow of the oil from the air vent hole toward the connection point via the second oil pump.

16 Claims, 8 Drawing Sheets

(56) References Cited

FOREIGN PATENT DOCUMENTS

| | | |
|---|---|---|
| JP | 2011-157981 A | 8/2011 |
| JP | 2011-185378 A | 9/2011 |
| JP | 2012-241785 A | 12/2012 |
| JP | 2013-148179 A | 8/2013 |
| KR | 10-2013-0092002 A | 8/2013 |

* cited by examiner

HYDRAULIC CONTROL SYSTEM

INCORPORATION BY REFERENCE

The disclosure of Japanese Patent Application No. 2013-222996 filed on Oct. 28, 2013 including the specification, drawings and abstract is incorporated herein by reference in its entirety.

BACKGROUND OF THE INVENTION

1. Field of the Invention

The invention relates to a hydraulic control system.

2. Description of Related Art

A hydraulic control system including a mechanical oil pump, and an electric oil pump provided in parallel with the mechanical oil pump, is known (see, for example, Japanese Patent Application Publication No. 2007-113640 (JP 2007-113640 A)). The mechanical oil pump is driven with power of an engine, and the electric oil pump is driven with power of a motor when the engine is stopped.

In the hydraulic control system of JP 2007-113640 A, a through-hole used for removal of air is formed in a case of the electric oil pump, and air contained in the interior of the electric oil pump is discharged from the through-hole when the electric oil pump is driven, so that the hydraulic pressure can be promptly raised.

SUMMARY OF THE INVENTION

In the hydraulic control system of JP 2007-113640 A, when the mechanical oil pump is driven, and the electric oil pump is stopped, for example, air may enter the interior of the system via the through-hole, under the intake negative pressure of the mechanical oil pump.

In a hydraulic control system in which a through-hole used for removal of air is formed in a case of a mechanical oil pump, air can be discharged from the through-hole when the mechanical oil pump is driven. However, when the electric oil pump is driven, and the mechanical oil pump is stopped, for example, air may enter the interior of the system via the through-hole, under the intake negative pressure of the electric oil pump.

Namely, in a hydraulic control system including a mechanical oil pump and an electric oil pump, in which a through-hole is provided for discharging air when one of the oil pumps is driven, like those as described above, when the other oil pump is driven and the above-indicated one of the oil pumps is stopped, air may enter the interior of the system via the through-hole, under the intake negative pressure of the other oil pump.

The invention provides a hydraulic control system capable of preventing air from entering through an air vent hole when the air vent hole is provided.

A hydraulic control system according to one aspect of the invention includes a first oil passage, a first oil pump, a second oil passage, a second oil pimp and a check valve. The first oil pump is disposed in the first oil passage. The second oil passage bypasses the first oil pump. The second oil passage includes an intake oil passage and a discharge oil passage. The intake oil passage and the first oil passage is connected to each other at a connection point. The discharge oil passage includes an air vent hole. The second oil pump is disposed in the second oil passage. The second oil pump is configured to take in oil from the intake oil passage. The second oil pump configured to discharge the oil into the discharge oil passage. The check valve is provided between the connection point and the air vent hole. The check valve restricts flow of the oil from the air vent hole toward the connection point via the second oil pump.

With the above arrangement, when the second oil pump is driven, the check valve is opened under the hydraulic pressure of the second oil pump, so that air can be discharged from the air vent hole. As a result, the hydraulic pressure can be promptly raised, and air can be prevented from entering parts to which the hydraulic pressure is supplied. Also, when the first oil pump is driven, and the second oil pump is stopped, the check valve is closed under the intake negative pressure of the first oil pump, so that air can be prevented from entering the second oil passage through the air vent hole. Accordingly, when the air vent hole is provided, air can be prevented from entering the interior of the system through the air vent hole.

In the hydraulic control system as described above, the check valve may be provided in the discharge oil passage.

With the above arrangement, even if air enters the interior of the system through the air vent hole, the air is likely to remain ahead of the second oil pump (on the discharge) owing to the check valve.

In the hydraulic control system as described above, the discharge oil passage may be connected to the first oil passage. The discharge oil passage may include a main oil passage connected to the first oil passage, and a branch oil passage that branches off from the main oil passage. The check valve and the air vent hole may be provided in the branch oil passage.

With the above arrangement, even if air enters the interior of the system through the air vent hole, the air is likely to remain in the branch oil passage owing to the check valve; therefore, air is prevented from entering the main oil passage.

In the hydraulic control system as described above, the branch oil passage may include an orifice.

With the above arrangement, air can be efficiently discharged from the air vent hole.

In the hydraulic control system as described above, the first oil pump may be configured to be driven with power of an engine, and the second oil pump may be configured to be driven with power of a motor. The second oil pump may be configured to be driven when an idle reduction condition is satisfied.

With the above arrangement, the second oil pump can be started before the discharge hydraulic pressure of the first oil pump is reduced to be lower than a predetermined value (required hydraulic pressure) as the engine speed is reduced. In this manner, air can be promptly discharged, so that the discharge hydraulic pressure of the second oil pump can be readily fed into a hydraulic circuit, or the like.

In the hydraulic control system as described above, the second oil pump may be configured to be driven when the idle reduction condition is satisfied, and an engine speed is lower than a predetermined value that is higher than an idle speed.

With the above arrangement, the second oil pump can be stated at an appropriate time.

According to the hydraulic control system of the invention air can be prevented from entering the interior of the system through the air vent hole, when an air vent hole is provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Some embodiments of the invention will be described with reference to the drawings.

Figure 1:
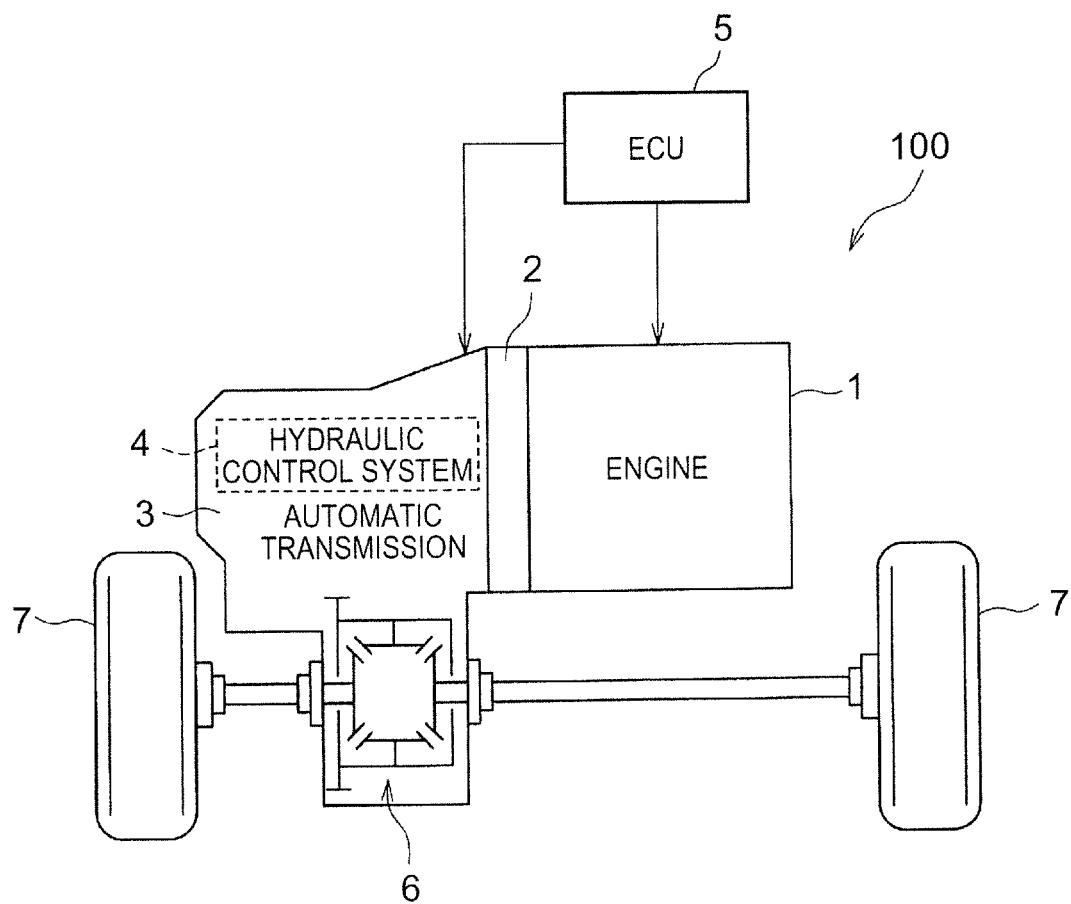
FIG. 1 is a view schematically showing the configuration of a vehicle including a hydraulic control system according to a first embodiment of the invention.
Figure 2:
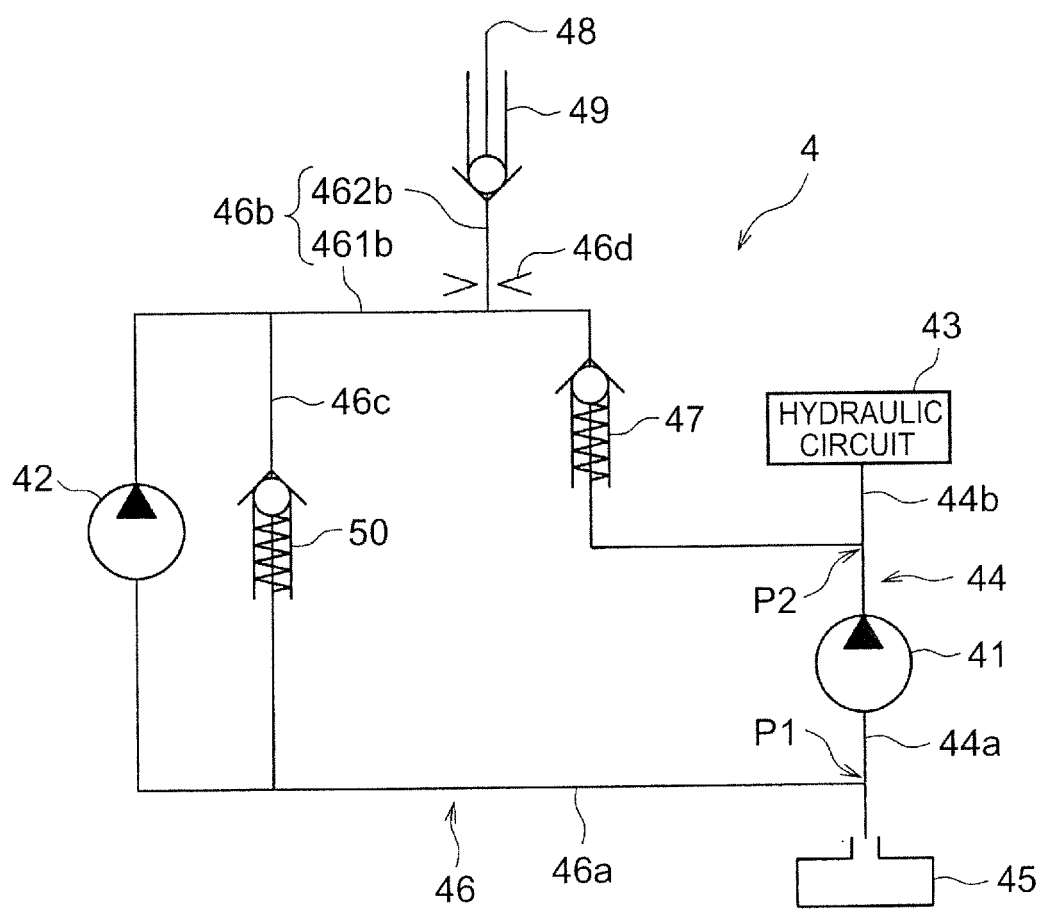
FIG. 2 is a circuit diagram showing the hydraulic control system of FIG. 1.
Figure 3:
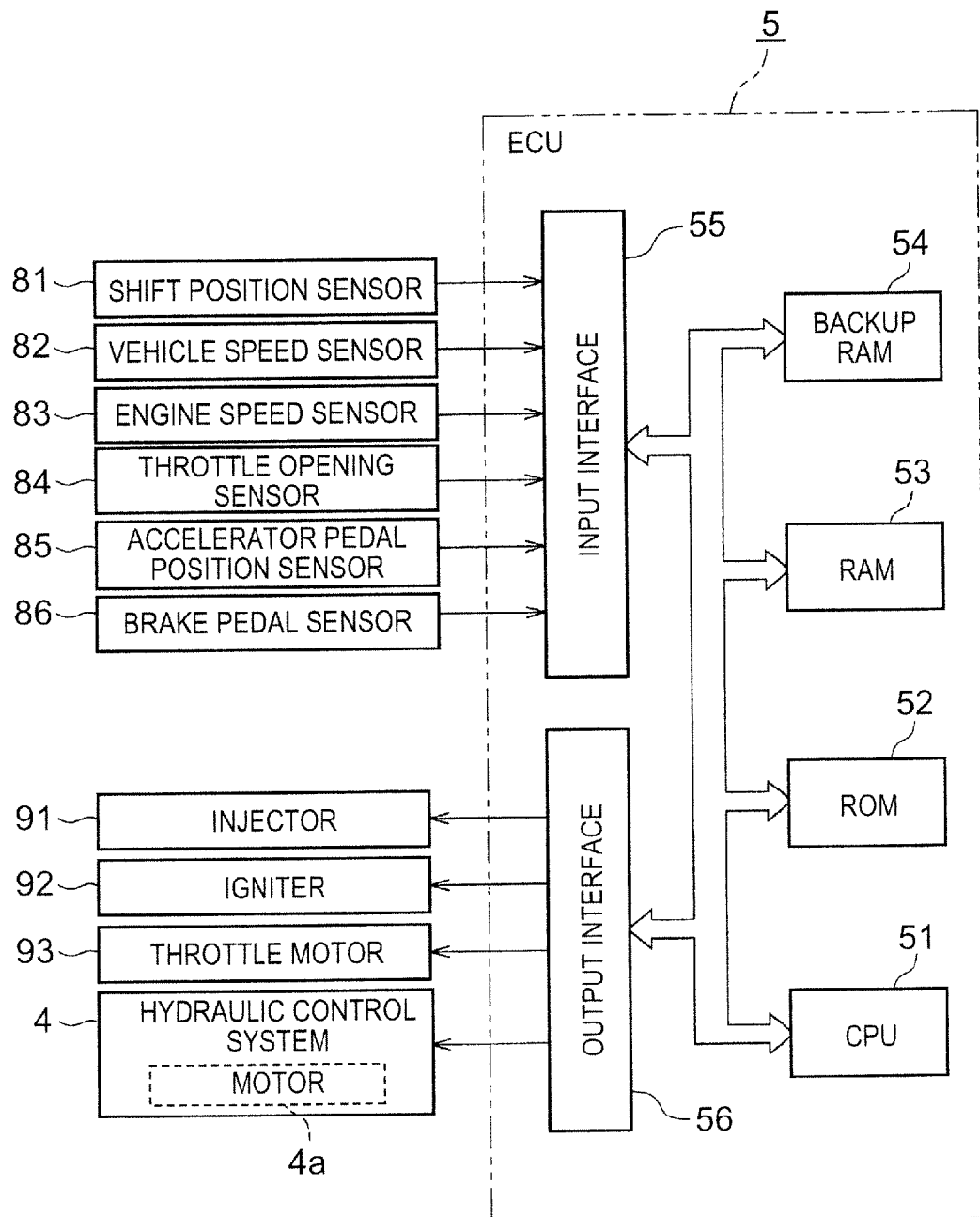
FIG. 3 is a block diagram showing an ECU of FIG. 1.

Referring first to FIG. 1 to FIG. 3, a vehicle 100 including a hydraulic control system 4 according to a first embodiment of the invention will be described.

As shown in FIG. 1, the vehicle 100 includes an engine 1, torque converter 2, automatic transmission 3, hydraulic control system 4, and an ECU 5. The vehicle 100 is of an front-engine, front-drive (FF) type, for example, and the output or power of the engine 1 is transmitted to a differential device 6 via the torque converter 2 and the automatic transmission 3, and is distributed to right and left drive wheels (front wheels) 7.

The engine (internal combustion engine) 1 is a source of driving force for running the vehicle, and is, for example, a multi-cylinder gasoline engine. The engine 1 is configured such that its operating conditions can be controlled by controlling the throttle opening (intake air amount) of a throttle valve, fuel injection amount, ignition timing, and so forth. An output shaft (crankshaft) of the engine 1 is coupled to the torque converter 2.

The torque converter 2 includes an input-side pump impeller, output-side turbine runner, stator having a torque amplifying function, and a lock-up clutch that directly coupes the pump impeller with the turbine runner. The pump impeller is coupled to the output shaft of the engine 1, and the turbine runner is coupled to an input shaft of the automatic transmission 3 via a turbine shaft.

The automatic transmission 3 has two or more gear positions, and includes two or more frictional engagement elements and a planetary gear unit. In the automatic transmission 3, one or more of the frictional engagement elements is/are selectively engaged, so that a selected one of the two or more gear positions can be established. An output shaft of the automatic transmission 3 is coupled to the drive wheels 7 via the differential device 6.

The hydraulic control system 4 is provided for controlling the state (engaged state or released state) of each of the frictional engagement elements of the automatic transmission 3. The hydraulic control system 4 also has the function of controlling the lock-up clutch of the torque converter 2.

As shown in FIG. 2, the hydraulic control system 4 includes a mechanical oil pump 41, an electric oil pump 42 provided in parallel with the mechanical oil pump 41, and a hydraulic circuit 43 that regulates the hydraulic pressure from the mechanical oil pump 41 or the electric oil pump 42, and supplies the regulated pressure to the frictional engagement elements of the automatic transmission 3 (see FIG. 1), etc.

The mechanical oil pump 41 is coupled to the output shaft of the engine 1 (see FIG. 1), and is driven with power of the engine 1. The mechanical oil pump 41 is a source of generation of the hydraulic pressure supplied to the hydraulic circuit 43, and is disposed in an oil passage 44. The mechanical oil pump 41 is one example of "first oil pump" of the invention, and the oil passage 44 is one example of "first oil passage" of the invention.

The oil passage 44 includes an intake oil passage 44a on the intake of the mechanical oil pump 41, and a discharge oil passage 44b on the discharge of the mechanical oil pump 41. The intake oil passage 44a is connected at one end to an oil pan 45 via a strainer, and is connected at the other end to an inlet of the mechanical oil pump 41. The discharge oil passage 44b is connected at one end to an outlet of the mechanical oil pump 41, and is connected at the other end to the hydraulic circuit 43.

The electric oil pump 42 is coupled to an output shaft of a motor 4a (see FIG. 3), and is driven with power of the motor 4a. The electric oil pump 42 is a source of generation of the hydraulic pressure supplied to the hydraulic circuit 43, and is disposed in an oil passage 46 that bypasses the mechanical oil pump 41. The electric oil pump 42 is provided for continuing supply of the hydraulic pressure to the hydraulic circuit 43, when the mechanical oil pump 41 is stopped due to shutdown of the engine 1. Drive control of the electric oil pump 42 will be described in detail later. The electric oil pump 42 is one example of "second oil pump" of the invention, and the oil passage 46 is one example of "second oil passage" of the invention.

The oil passage 46 includes an intake oil passage 46a on the intake of the electric oil pump 42, a discharge oil passage 46b on the discharge of the electric oil pump 42, and a bypass oil passage 46c that connects the intake oil passage 46a with the discharge oil passage 46b.

The intake oil passage 46a is connected at one end to the intake oil passage 44a at a connection point P, and is connected at the other end to an inlet of the electric oil pump 42. Therefore, a portion of the intake oil passage 44a located between the connection point P1 and the oil pan 45 is shared by the mechanical oil pump 41 and the electric oil pump 42. The connection point P1 is one example of "connection point" of the invention.

The discharge oil passage 46b has a main oil passage 461b connected to the discharge oil passage 44b of the oil passage 44, and a branch oil passage 462b that branches off from the main passage 461b.

The main oil passage 461b of the discharge oil passage 46b is connected at one end to an outlet of the electric oil pump 42, and is connected at the other end to the discharge oil passage 44b of the oil passage 44 at a connection point P2. Therefore, a portion of the discharge oil passage 44b located between the connection point P2 and the hydraulic circuit 43 is shared by the mechanical oil pump 41 and the electric oil pump 42. The main oil passage 461b is provided with a check valve 47 for preventing the oil discharged from the mechanical oil pump 41 from flowing back to the electric oil pump 42 when the mechanical oil pump 41 is driven. The check valve 47 is arranged to be opened when a difference between a pressure at the outlet side of the electric oil pump 42 and a pressure at the hydraulic circuit 43 side becomes larger than a predetermined value.

The branch oil passage 462b of the discharge oil passage 46b is connected at one end to the main oil passage 461b, and is provided at the other end with an air vent hole 48. One end of the branch oil passage 462b is connected to a portion of the main oil passage 461b located between the outlet of the electric oil pump 42 and the check valve 47. Also, an orifice 46d is provided in the vicinity of one end of the branch oil passage 462b. The orifice diameter of the orifice 46d is set to 1.0 mm, for example, and the orifice 46d is able to curb or restrict discharge of oil from the air vent hole 48, while promoting discharge of air from the air vent hole 48. The air vent hole 48, which is disposed in the discharge oil passage 46b, serves as an opening that communicates the oil passage 46 with the atmosphere so that the oil passage 46 is open to the atmosphere. For example, the air vent hole 48 communicates with space located above the oil level of the oil pan 45. The air vent hole 48 may also communicate with a drain circuit (not shown) in an oil passage circuit of a case or a valve body, or may communicate with space located below the oil level of the oil pan 45.

The branch oil passage 462b is also provided with a check valve 49 for curbing back flow (flow from the above-indicated other end to one end of the branch oil passage 462b). Namely, the check valve 49 is disposed between the air vent hole 48 and the connection point P1. The check valve 49 is arranged to be opened under the hydraulic pressure of the electric oil pump 42 when the electric oil pump 42 is driven. Therefore, when the electric oil pump 42 is driven, air mixed into the oil can be removed through the air vent hole 48. Since the oil flows (in the forward direction) from the above-indicated one end to the other end of the branch oil passage 462b when the electric oil pump 42 is driven, the permissible amount of oil is discharged from the air vent hole 48. When the electrically oil pump 42 is stopped, and the mechanical oil pump 41 is driven, the check valve 49 is arranged to be closed under the negative pressure developed on the intake of the mechanical oil pump 41. With this arrangement, air is prevented from entering from the air vent hole 48.

The bypass oil passage 46c is connected at one end to the intake oil passage 46a, and is connected at the other end to the main passage 461b of the discharge oil passage 46b. The other end of the bypass oil passage 46c is connected to a portion of the main oil passage 461b located between the outlet of the electric oil pump 42 and the check valve 47. The bypass oil passage 46c is provided with a relief valve 50 for discharging excess flow from the electric oil pump 42. The relief valve 50 is arranged to be opened when a difference between a pressure on the discharge of the electric oil pump 42 and a pressure on the intake of the same pump 42 becomes larger than a predetermined value.

The hydraulic circuit 43 regulates the hydraulic pressure supplied from the mechanical oil pump 41 or the electric oil pump 42, so as to produce a line pressure PL, and further regulates the line pressure PL so that the regulated pressure is supplied to the automatic transmission 3 (see FIG. 1) and the torque converter 2 (see FIG. 1), for example.

The Electronic Control Unit (ECU) 5 is configured to perform operation control of the engine 1 and shift control of the automatic transmission 3. More specifically, the ECU 5 includes a Central Processing Unit (CPU) 51, Read Only Memory (ROM) 52, Random Access Memory (RAM) 53, backup RAM 54, input interface 55, and an output interface 56, as shown in FIG. 3.

The CPU 51 performs arithmetic processing based on various control programs and maps stored in the ROM 52. The ROM 52 stores various control programs, and maps referred to when the control programs are executed. The RAM 53 is a memory that temporarily stores computation results obtained by the CPU 51, detection results of respective sensors, and so forth. The backup RAM 54 is a non-volatile memory that stores data that should be saved when the ignition switch is turned off, and so forth.

A shift position sensor 81, vehicle speed sensor 82, engine speed sensor 83, throttle opening sensor 84, accelerator pedal position sensor 85, brake pedal sensor 86, and so forth, are connected to the input interface 55.

The shift position sensor 81 is provided for detecting the shift position selected with a shift lever. The shift position can be selected with the shift lever from, for example, a drive position for forward running, a reverse position for reverse running, and a neutral position.

The vehicle speed sensor 82 is provided for detecting the speed of the vehicle 100, and the engine speed sensor 83 is provided for detecting the number of revolutions (rotational speed) of the output shaft of the engine 1. The throttle opening sensor 84 is provided for detecting the throttle opening of the throttle valve, and the accelerator pedal position sensor 85 is provided for detecting the accelerator pedal position as the amount of depression of the accelerator pedal. The brake pedal sensor 86 is provided for detecting the pedal force (brake pedal force) applied to the brake pedal.

Injectors 91, igniters 92, throttle motor 93, hydraulic control system 4, and so forth, are connected to the output interface 56.

The ECU 5 is configured to control operating conditions of the engine 1, by controlling the throttle opening to be controlled by the throttle motor 93, the fuel injection amount as the amount of fuel injected from the injectors 91, ignition timing of the igniters 92, and so forth. Also, the ECU 5 is configured to perform shift control of the automatic transmission 3 (see FIG. 1) and control of the lock-up clutch of the torque converter 2 (see FIG. 1), by controlling the hydraulic control system 4.

Furthermore, the ECU 5 is configured to perform idle reduction control and drive control of the electric oil pump as will be described later. The idle reduction means automatically stopping the engine 1 when the vehicle 100 is stopped, for example, and automatically restarting the engine 1 when the vehicle 100 is subsequently started.

Figure 4:
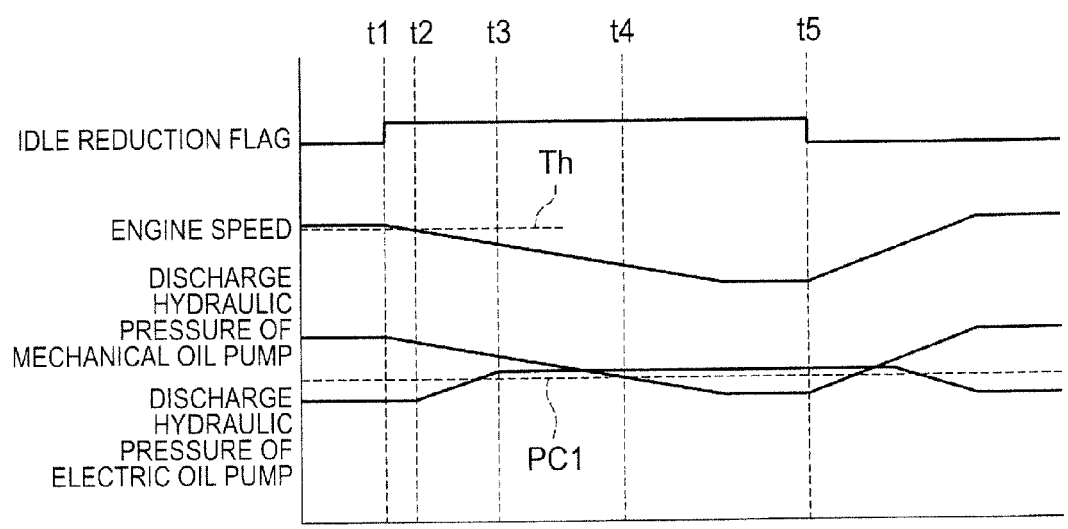
FIG. 4 is a timing chart useful for explaining idle reduction control in the vehicle of FIG. 1.

Referring next to FIG. 4, the idle reduction control performed in the vehicle 100 of this embodiment will be described.

Initially, at time t1 at which an idle reduction condition or conditions is/are satisfied, and an idle reduction flag is set to ON, the operation of the engine 1 (see FIG. 1) is stopped. The idle reduction conditions are set based on the vehicle speed, the amount of depression of the brake pedal, and the accelerator pedal position. For example, it is determined that the idle reduction conditions are satisfied when the vehicle speed is in the range of 0-12 km/h, and the brake pedal is depressed. If the operation of the engine 1 is stopped, the engine speed is reduced, and the discharge hydraulic pressure of the mechanical oil pump 41 (see FIG. 2) is reduced as the engine speed is reduced.

At time t2 at which the engine speed becomes lower than a predetermined value Th, the electric oil pump 42 (see FIG. 2) is driven. The predetermined value Th is a preset value (e.g., 1500 rpm) that is higher than the idle speed. Namely, the electric oil pump 42 is started before the engine speed is reduced down to the idle speed. Since the air vent hole 48 (see FIG. 2) is provided in the hydraulic control system 4 (see FIG. 2) of this embodiment, air is promptly discharged once the electric oil pump 42 is started, so that the discharge hydraulic pressure of the electric oil pump 42 can be readily fed toward the hydraulic circuit 43 (see FIG. 2).

Then, at time t3 before the discharge hydraulic pressure of the mechanical oil pump 41 is reduced to be lower than a required hydraulic pressure PC1 of the hydraulic circuit 43, the discharge hydraulic pressure of the electric oil pump 42 becomes higher than the required hydraulic pressure PC1. The required hydraulic pressure PC1 is a hydraulic pressure required for the hydraulic circuit 43 to produce the line pressure PL. Thus, the hydraulic control system 4 is brought into a condition where a hydraulic pressure higher than the required hydraulic pressure PC1 can be supplied from the electric oil pump 42 to the hydraulic circuit 43.

Then, at time t4 at which the discharge hydraulic pressure of the mechanical oil pump 41 is reduced to be lower than the required hydraulic pressure PC1, the hydraulic pressure is supplied from the electric oil pump 42 to the hydraulic circuit 43. Thus, when the mechanical oil pump 41 is stopped due to shutdown of the engine 1, the hydraulic pressure is supplied from the electric oil pump 42 to the hydraulic circuit 43, so that the hydraulic control system 4 is able to appropriately control the state of each of the frictional engagement elements of the automatic transmission 3 (see FIG. 1).

Then, at time t5 at which an idle reduction cancellation condition or conditions is/are satisfied, and the idle reduction flag is set to OFF, the engine 1 is restarted. The idle reduction cancellation condition is satisfied when the brake pedal is released, for example. Once the engine 1 is operated, the engine speed is increased, and the discharge hydraulic pressure of the mechanical oil pump 41 is increased as the engine speed is increased.

Then, if the hydraulic control system 4 is brought into a condition where the required hydraulic pressure PC1 can be supplied from the mechanical oil pump 41 to the hydraulic circuit 43, the electric oil pump 42 is stopped. At this time, the hydraulic pressure is supplied from the mechanical oil pump 41 to the hydraulic circuit 43.

Figure 5:
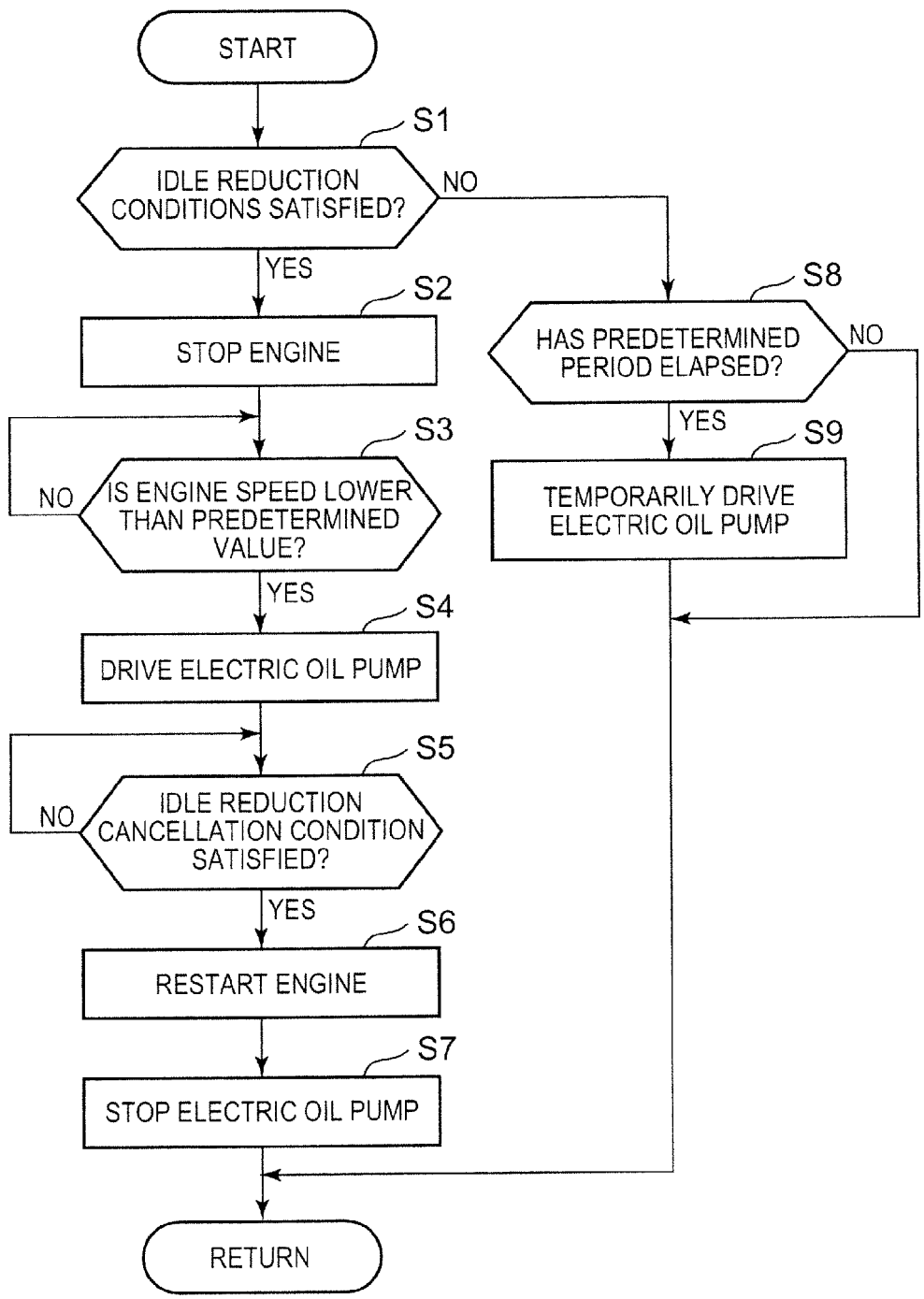
FIG. 5 is a flowchart illustrating drive control of an electric oil pump in the vehicle of FIG. 1.

Referring next to FIG. 5, the drive control of the electric oil pump 42 of this embodiment will be described. Each step of the control flow of FIG. 5 is executed by the ECU 5. The control flow of FIG. 5 is repeatedly executed.

Initially, in step S1, it is determined whether the idle reduction conditions are satisfied. If it is determined that the idle reduction conditions are satisfied, the idle reduction flag is set to ON, and the control proceeds to step S2. If, on the other hand, it is determined that the idle reduction conditions are not satisfied, the idle reduction flag remains OFF, and the control proceeds to step S8.

Then, in step S2, the operation of the engine 1 (see FIG. 1) is stopped. More specifically, supply of the fuel from the injectors 91 (see FIG. 3) is stopped (the fuel is cut), and the firing operation of the igniters 92 (see FIG. 3) is stopped (the firing is cut).

Then, in step S3, it is determined whether the engine speed is reduced to be lower than the predetermined value Th (see FIG. 4). If it is determined that the engine speed is not lower than the predetermined value Th, step S3 is repeatedly executed. Namely, the ECU 5 waits until the engine speed becomes lower than the predetermined value Th. If it is determined that the engine speed is lower than the predetermined value Th, the control proceeds to step S4.

In step S4, the electric oil pump 42 (see FIG. 2) is driven. Namely, the electric oil pump 42 is started before the engine speed is reduced down to the idle speed. As a result, air is promptly discharged, and the discharge hydraulic pressure of the electric oil pump 42 can be readily fed toward the hydraulic circuit 43 (see FIG. 2). Then, before the discharge hydraulic pressure of the mechanical oil pump 41 (see FIG. 2) becomes lower than the required hydraulic pressure PC1 (see FIG. 4) of the hydraulic circuit 43, the hydraulic control system 4 is brought into a condition where a hydraulic pressure higher than the required hydraulic pressure PC1 can be supplied from the electric oil pump 42 to the hydraulic circuit 43. When the discharge hydraulic pressure of the mechanical oil pump 41 is reduced to be lower than the required hydraulic pressure PC1, the hydraulic pressure is supplied from the electric oil pump 42 to the hydraulic circuit 43.

Then, in step S5, it is determined whether the idle reduction cancellation condition is satisfied. If it is determined that the idle reduction cancellation condition is not satisfied, the idle reduction flag remains ON, and step S5 is repeatedly executed. Namely, the engine 1 is kept in an idle reduction condition, and the electric oil pump 42 is kept driven. If it is determined that the idle reduction cancellation condition is satisfied, the idle reduction flag is set to OFF, and the control proceeds to step S6.

Then, in step S6, the engine 1 is restarted. More specifically, the engine 1 is cranked by means of a starter motor (not shown), and supply of the fuel from the injectors 91 and the ignition operation of the igniters 92 are resumed. At this time, the mechanical oil pump 41 is driven with power of the engine 1.

Then, in step S7, the electric oil pump 42 is stopped. The hydraulic pressure is supplied from the mechanical oil pump 41 to the hydraulic circuit 43. Thereafter, the control flow returns. In step S7, the electric oil pump 42 may be stopped under a condition that the engine speed becomes equal to or higher than a predetermined speed. The predetermined speed may be set to an engine speed at which the mechanical oil pump 41 is able to supply a hydraulic pressure higher than the required hydraulic pressure PC1 to the hydraulic circuit 43 after the engine is restarted. Also, the predetermined speed may be the same value as the above-described predetermined value Th, or may be another value.

When the idle reduction condition is not satisfied (step S1: NO), it is determined in step S8 whether a predetermined period of time has elapsed since the electric oil pump 42 is stopped. The predetermined period is set in advance. If it is determined that the predetermined period has elapsed, the control proceeds to step S9. If, on the other hand, the predetermined period has not elapsed, the control flow returns.

In step S9, the electric oil pump 42 is temporarily driven. The electric oil pump 42 is driven only for a given period of time in order to discharge air, but not in order to supply a hydraulic pressure to the hydraulic circuit 43. Then, the control flow returns.

In this embodiment, the air vent hole 48 is provided in the discharge oil passage 46b of the oil passage 46, and the check valve 49 is provided between the air vent hole 48 and the connection point P1, as described above. With this arrangement, when the electric oil pump 42 is driven, the check valve 49 is opened under the hydraulic pressure of the electric oil pump 42, so that air can be discharged from the air vent hole 48; therefore, the hydraulic pressure can be quickly raised, and air is prevented from entering parts (such as the automatic transmission 3 and the torque converter 2)

to which the hydraulic pressure is supplied. When the mechanical oil pump 41 is driven and the electric oil pump 42 is stopped, the check valve 49 is closed under the intake negative pressure of the mechanical oil pump 41, so that air is prevented from entering the oil passage 46 through the air vent hole 48. Accordingly, where the air vent hole 48 is provided, air is prevented from entering through the air vent hole 48. As a result, it becomes less difficult to resume the driving force, which was difficult due to entry of air into the torque converter 2, and oil vibration is less likely to occur due to entry of air into the hydraulic circuit 43. Further, air can be easily discharged even if the length of the oil passage 46 is increased; therefore, the location of the electric oil pump 42 is selected when installed, with an improved degree of freedom. In addition, the capacity of the electric oil pump 42 can be reduced.

Also, in this embodiment, the discharge oil passage 46b includes the branch oil passage 462b, and the air vent hole 48 and the check valve 49 are located in the branch oil passage 462b. With this arrangement, even if air enters the branch oil passage 462b via the air vent hole 48, the air is likely to remain in the branch oil passage 462b owing to the check valve 49; therefore, the air can be prevented from entering the main oil passage 461b.

In this embodiment, the orifice 46d is provided in the branch oil passage 462b, so that air can be efficiently discharged from the air vent hole 48.

In this embodiment, the electric oil pump 42 is driven when the idle reduction conditions are satisfied and the engine speed is reduced to be lower than the predetermined value Th. Thus, the electric oil pump 42 can be started before the discharge hydraulic pressure of the mechanical oil pump 41 becomes lower than the required hydraulic pressure PC1 of the hydraulic circuit 43 due to reduction of the engine speed. In this manner, air can be promptly discharged, so that the discharge hydraulic pressure of the electric oil pump 42 can be easily fed to the hydraulic circuit 43. Therefore, when the discharge hydraulic pressure of the mechanical oil pump 41 is reduced to be lower than the required hydraulic pressure PC1, the hydraulic pressure can be supplied from the electric oil pump 42 to the hydraulic circuit 43. Accordingly, the engine 1 is prevented from being restarted in a condition where the hydraulic pressure supplied to the hydraulic circuit 43 is lower than the required hydraulic pressure PC1, due to delay in supply of the hydraulic pressure from the electric oil pump 42, and engagement shock is less likely or unlikely to occur when the hydraulic pressure supplied to the hydraulic circuit 43 is resumed, and the frictional engagement element(s) of the automatic transmission 3 is/are engaged. Namely, when the discharge hydraulic pressure of the mechanical oil pump 41 is reduced, the hydraulic pressure is appropriately supplied from the electric oil pump 42 to the hydraulic circuit 43, so that the hydraulic control system 4 appropriately controls the state of each of the frictional engagement elements of the automatic transmission 3. Thus, occurrence of engagement shock can be curbed even when the engine 1 is restarted early; therefore, the system can deal with early restart of the engine 1. Also, the electric oil pump 42 can be started at an appropriate time, and can be thus prevented from being unnecessarily driven.

Also, in this embodiment, the electric oil pump 42 is temporarily driven when the predetermined time elapses, so that the amount of air mixed into the oil passage 46 when the idle reduction conditions are satisfied can be reduced to be smaller than a given value (for example, the upper limit of air that can be discharged when the idle reduction conditions are satisfied and the electric oil pump 42 is driven). Thus, air can be appropriately discharged when the idle reduction conditions are satisfied.

Figure 6:
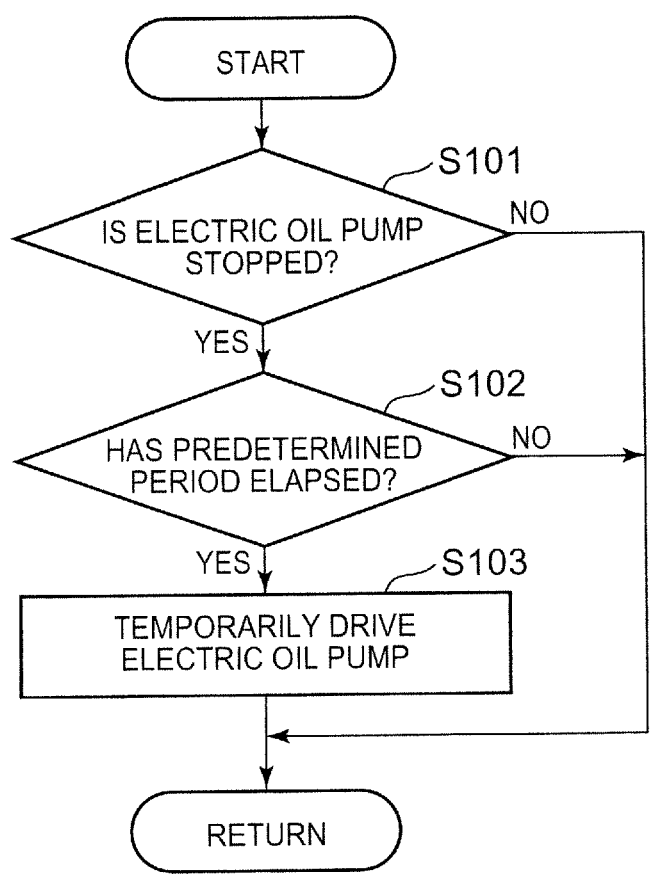
FIG. 6 is a flowchart illustrating drive control of an electric oil pump according to a second embodiment of the invention.

Referring next to FIG. 6, the vehicle 100 including the hydraulic control system 4 according to a second embodiment of the invention will be described. The vehicle 100 of the second embodiment has the same configuration as that of the first embodiment. In the second embodiment, the drive control of the electric oil pump is performed in a different manner from that of the first embodiment. In the following, the drive control of the electric oil pump according to the second embodiment will be described. Each step of the control flow of FIG. 6 is executed by the ECU 5. The control flow of FIG. 6 is repeatedly executed.

Initially, in step S101, the ECU 5 determines whether the electric oil pump 42 is stopped. If the electric oil pump 42 is stopped, the control proceeds to step S102. If the electric oil pump 42 is not stopped (namely, if the electric oil pump 42 is being driven), the control flow returns. In this connection, the electric oil pump 42 is stopped when the required hydraulic pressure PC1 is ensured even if the electric oil pump 42 is not driven. More specifically, the electric oil pump 42 is stopped when the idle reduction is cancelled and the engine is driven, so that the engine speed reaches a predetermined rotational speed, for example.

In step S102, if a period of time that elapses from the time when the electric oil pump 42 is stopped is equal to or longer than a predetermined period, the probability of mixing of air into oil is presumed to be high, and the control proceeds to step S103. If, on the other hand, the period of time that elapses from the time when the electric oil pump 42 is stopped is shorter than the predetermined period, the control flow returns. The "period of time that elapses from the time when the electric oil pump 42 is stopped" may be an elapsed time from the time when a condition for stopping the electric oil pump 42 is satisfied as described above, or may be an elapsed time from the time when the electric oil pump 42 is actually stopped. These elapsed times may be measured and used.

In step S103, the electric oil pump 42 is temporarily driven for removal of air. The electric oil pump 42 is temporarily driven only for a given time in order to discharge air, but not in order to supply the hydraulic pressure to the hydraulic circuit. Then, the control flow returns.

The effect of the hydraulic control system 4 of the second embodiment is the same as that of the hydraulic control system 4 of the first embodiment. Also, in the second embodiment, the electric oil pump 42 is temporarily driven when the predetermined time elapses, so that the amount of air mixed into the oil passage 46 when the idle reduction conditions are satisfied can be reduced to be smaller than a given value (for example, the upper limit of air that can be discharged when the idle reduction conditions are satisfied and the electric oil pump 42 is driven). Thus, air can be appropriately discharged when the idle reduction conditions are satisfied.

The embodiments disclosed herein are exemplary in all respects, and provide no basis for restrictive interpretation. Accordingly, the technical scope of the invention is not to be interpreted only based on the above-described embodiments, but is defined based on the statement of the appended claims. Also, the technical scope of the invention includes all changes within the range of the claims and equivalents thereof.

While the vehicle 100 is of the front-engine, front-drive (FF) type in the illustrated embodiments, the vehicle may be of a front-engine, rear-drive (FR) type, or may be a four-wheel drive vehicle.

While the automatic transmission 3 is provided in the vehicle 100 in the illustrated embodiments, the invention is not limited to this arrangement, but a belt-and-pulley type continuously variable transmission may be provided in the vehicle.

Figure 7:
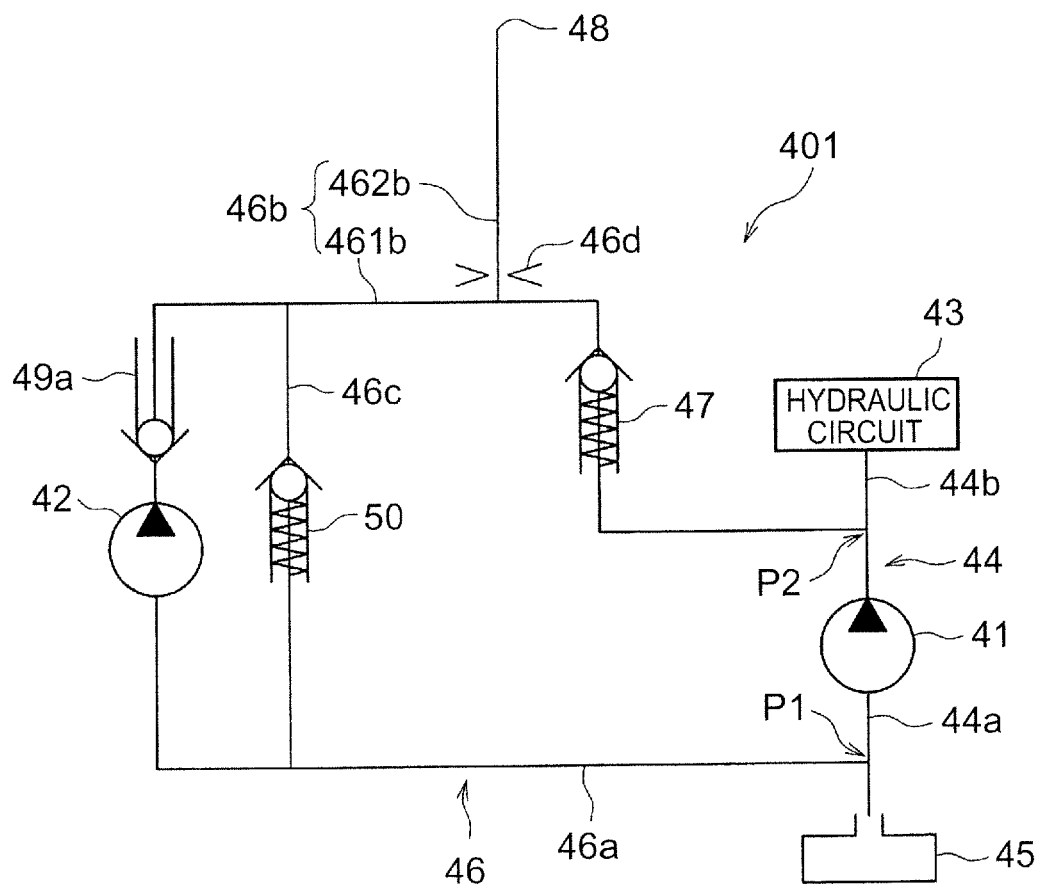
FIG. 7 is a circuit diagram showing a hydraulic control system according to a first modified example of the embodiment of FIG. 1.

While the check valve 49 is provided in the branch oil passage 462b in the illustrated embodiments, the invention is not limited to this arrangement, but a check valve 49a may be provided in the main oil passage 461b of the discharge oil passage 46b, as in a hydraulic control system 401 according to a first modified example as shown in FIG. 7. With this arrangement, too, when the electric oil pump 42 is driven, the check valve 49a is opened under the hydraulic pressure of the electric oil pump 42, so that air can be discharged from the air vent hole 48. Thus, the hydraulic pressure can be quickly raised, and air can be prevented from entering parts (such as the automatic transmission 3 and the torque converter 2) to which the hydraulic pressure is supplied. Also, when the mechanical oil pump 41 is driven, and the electric oil pump 42 is stopped, the check valve 49a is closed under the intake negative pressure of the mechanical oil pump 41, so that air can be prevented from entering the oil passage 46 through the air vent hole 48. Further, even if air enters through the air vent hole 48, the air is likely to remain ahead of the electric oil pump 42 (on the discharge) due to the check valve 49a.

Figure 8:
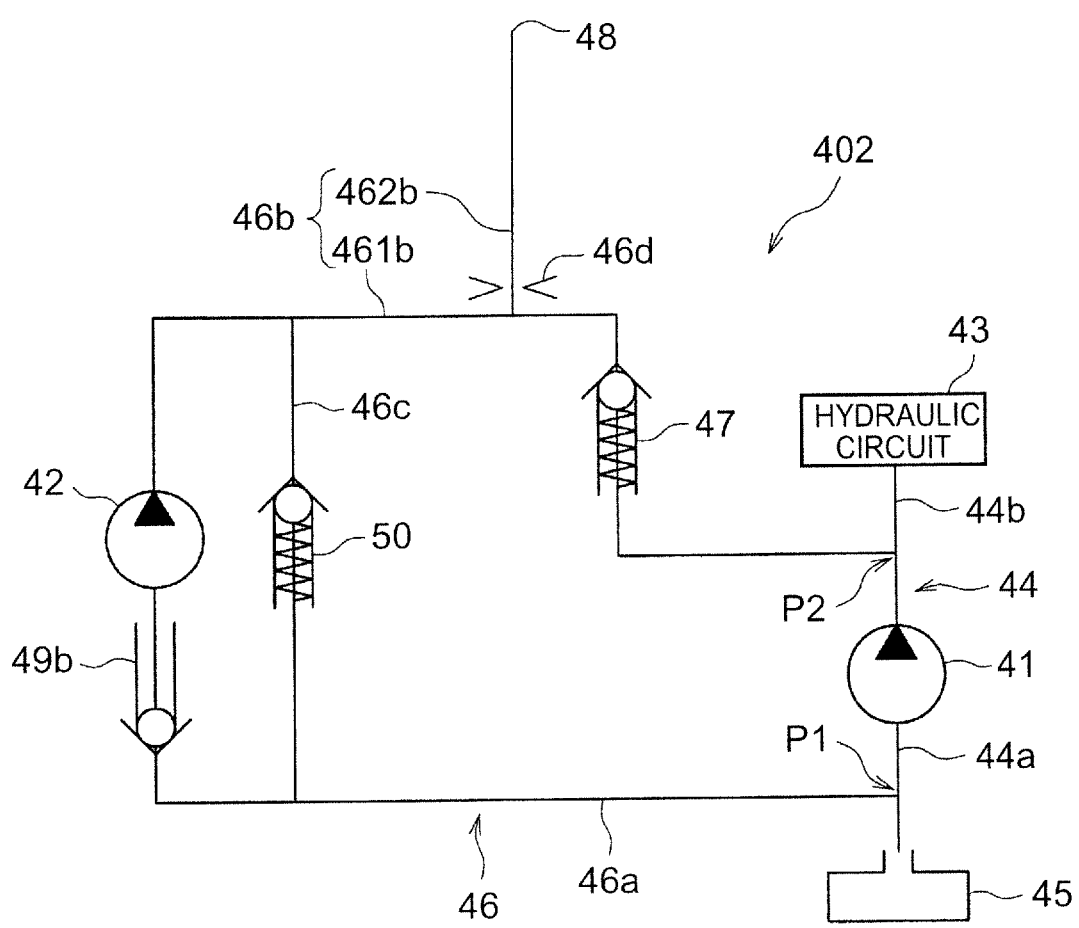
FIG. 8 is a circuit diagram showing a hydraulic control system according to a second modified example of the embodiment of FIG. 1.

Also, a check valve 49b may be provided in the intake oil passage 46a as in a hydraulic control system 402 according to a second modified example as shown in FIG. 8. With this arrangement, too, when the electric oil pump 42 is driven, the check valve 49b is opened under the hydraulic pressure of the electric oil pump 42, so that air can be discharged from the air vent hole 48. Thus, the hydraulic pressure can be quickly raised, and air can be prevented from entering parts (such as the automatic transmission 3 and the torque converter 2) to which the hydraulic pressure is supplied. Also, when the mechanical oil pump 41 is driven, and the electric oil pump 42 is stopped, the check valve 49b is closed under the intake negative pressure of the mechanical oil pump 41, so that air can be prevented from entering the oil passage 46 through the air vent hole 48.

While the air vent hole 48 is provided at the other end of the branch oil passage 462b in the first modified example and second modified example of the illustrated embodiment, the invention is not limited to this arrangement, but no branch oil passage may be provided, and an air vent hole may be provided in the main passage 461b of the discharge oil passage 46b.

While the electric oil pump 42 is driven when the idle reduction conditions are satisfied and the engine speed is reduced to be lower than the predetermined value Th in the illustrated embodiments, the invention is not limited to this arrangement. In the case where a line pressure sensor for measuring the line pressure is provided, the electric oil pump may be driven when the idle reduction conditions are satisfied, and the line pressure is reduced to be lower than a predetermined value. Also, the electric oil pump may be driven when the idle reduction conditions are satisfied. Namely, step S3 of FIG. 5 may be eliminated, and the electric oil pump may be driven irrespective of whether the engine speed is lower than the predetermined value.

In the illustrated embodiments, the idle reduction conditions may include other conditions, such as a condition that the shift lever is placed in the drive position, or one or more conditions may be removed from the idle reduction conditions. Also, the idle reduction conditions may include a condition that the engine speed is reduced to be lower than the predetermined value Th.

In the illustrated embodiments, the idle reduction cancellation conditions may include other conditions, such as a condition that the accelerator pedal is depressed, or one or more conditions may be removed from the idle reduction cancellation conditions.

In the illustrated embodiments, the ECU 5 may consist of two or more ECUs.

In the illustrated embodiments, the mechanical oil pump 41 is indicated as one example of the first oil pump of the invention, and the electric oil pump 42 is indicated as one example of the second oil pump of the invention. However, the first oil pump of the invention may be an electric oil pump, and the second oil pump of the invention may be a mechanical oil pump.

This invention may be applied to a hydraulic control system including a first oil pump, and a second oil pump provided in parallel with the first oil pump.

What is claimed is:

1. A hydraulic control system comprising:
   a first oil passage;
   a mechanical oil pump disposed in the first oil passage, the mechanical oil pump configured to be driven with power of an engine;
   a second oil passage bypassing the mechanical oil pump, the second oil passage including an intake oil passage and a discharge oil passage, the intake oil passage and the first oil passage being connected to each other at a connection point, and the discharge oil passage including an air vent hole;
   an electric oil pump disposed in the second oil passage, the electric oil pump configured to be driven with power of a motor, the electric oil pump configured to take in oil from the intake oil passage, and the electric oil pump configured to discharge the oil into the discharge oil passage; and
   a check valve being provided between the connection point and the air vent hole, the check valve configured to restrict flow of the oil from the air vent hole toward the connection point via the electric oil pump.

2. The hydraulic control system according to claim 1, wherein the check valve is provided in the discharge oil passage.

3. The hydraulic control system according to claim 1, wherein:
   the discharge oil passage includes a main oil passage connected to the first oil passage, and a branch oil passage that branches off from the main oil passage; and
   the check valve and the air vent hole are provided in the branch oil passage.

4. The hydraulic control system according to claim 3, wherein the branch oil passage includes an orifice.

5. The hydraulic control system according to claim 1, wherein:
   the electric oil pump is configured to be driven when an idle reduction condition is satisfied.

6. The hydraulic control system according to claim 5, wherein
   the electric oil pump is configured to be driven when the idle reduction condition is satisfied, and an engine speed is lower than a predetermined value that is higher than an idle speed.

7. A hydraulic control system comprising:
a first oil passage;
a first oil pump disposed in the first oil passage;
a second oil passage bypassing the first oil pump, the second oil passage including an intake oil passage and a discharge oil passage, the intake oil passage and the first oil passage being connected to each other at a connection point, and the discharge oil passage including a main oil passage and a branch oil passage, the main oil passage connected to the first oil passage, the branch oil passage branches off from the main oil passage, the branch oil passage includes an air vent hole;
a second oil pump disposed in the second oil passage, the second oil pump configured to take in oil from the intake oil passage, and the second oil pump configured to discharge the oil into the discharge oil passage; and
a check valve being provided in the main oil passage between the connection point and the air vent hole, the check valve configured to restrict flow of the oil from the air vent hole toward the connection point via the second oil pump.

8. The hydraulic control system according to claim 7, wherein the branch oil passage includes an orifice.

9. The hydraulic control system according to claim 7, wherein:
the first oil pump is configured to be driven with power of an engine;
the second oil pump is configured to be driven with power of a motor.

10. The hydraulic control system according to claim 9, wherein:
the second oil pump is configured to be driven when an idle reduction condition is satisfied.

11. The hydraulic control system according to claim 10, wherein
the second oil pump is configured to be driven when the idle reduction condition is satisfied, and an engine speed is lower than a predetermined value that is higher than an idle speed.

12. A hydraulic control system comprising:
a first oil passage;
a first oil pump disposed in the first oil passage;
a second oil passage bypassing the first oil pump, the second oil passage including an intake oil passage and a discharge oil passage, the intake oil passage and the first oil passage being connected to each other at a connection point, and the discharge oil passage including a main oil passage and a branch oil passage, the main oil passage connected to the first oil passage, the branch oil passage branches off from the main oil passage, the branch oil passage includes an air vent hole;
a second oil pump disposed in the second oil passage, the second oil pump configured to take in oil from the intake oil passage, and the second oil pump configured to discharge the oil into the discharge oil passage; and
a check valve being provided in intake oil passage between the connection point and the second oil pump, the check valve configured to restrict flow of the oil from the air vent hole toward the connection point via the second oil pump.

13. The hydraulic control system according to claim 12, wherein the branch oil passage includes an orifice.

14. The hydraulic control system according to claim 12, wherein:
the first oil pump is configured to be driven with power of an engine; and
the second oil pump is configured to be driven with power of a motor.

15. The hydraulic control system according to claim 14, wherein:
the second oil pump is configured to be driven when an idle reduction condition is satisfied.

16. The hydraulic control system according to claim 15, wherein
the second oil pump is configured to be driven when the idle reduction condition is satisfied, and an engine speed is lower than a predetermined value that is higher than an idle speed.

* * * * *